(12) United States Patent
Masiyowski et al.

(10) Patent No.: US 9,160,753 B2
(45) Date of Patent: Oct. 13, 2015

(54) ANALOG VOICE BRIDGE

(75) Inventors: John F. Masiyowski, Oak Hill, VA (US);
Raymond A. Magon, Fairfax, VA (US);
Michael O. Tierney, Ashburn, VA (US);
Robert L. Marchant, Severn, MD (US)

(73) Assignee: Raytheon Company, Waltham, MA (US)

( * ) Notice: Subject to any disclaimer, the term of this patent is extended or adjusted under 35 U.S.C. 154(b) by 1017 days.

(21) Appl. No.: 12/686,886

(22) Filed: Jan. 13, 2010

(65) Prior Publication Data

US 2010/0296507 A1    Nov. 25, 2010

Related U.S. Application Data

(60) Provisional application No. 61/216,979, filed on May 22, 2009.

(51) Int. Cl.
*H04L 9/36* (2006.01)
*H04L 29/06* (2006.01)
(Continued)

(52) U.S. Cl.
CPC .............. *H04L 63/105* (2013.01); *H04L 63/30* (2013.01); *H04L 65/103* (2013.01); *H04L 65/1076* (2013.01)

(58) Field of Classification Search
CPC ..... H04L 63/105; H04L 63/107; G06F 21/53; G06F 2221/2113
USPC ......... 370/352, 401, 329, 351, 488, 490, 494, 370/493; 713/151, 166; 726/1
See application file for complete search history.

(56) References Cited

U.S. PATENT DOCUMENTS 4,012,595 A *   3/1977   Ota ............................... 370/435
4,981,371 A     1/1991   Gurak et al.
(Continued)

FOREIGN PATENT DOCUMENTS

GB    2 264 210    8/1993
GB    2264210      8/1993
(Continued)

OTHER PUBLICATIONS

PCT Notification of Transmittal of the Intl. Search Report and the Written Opinion of the Intl. Searching Authority, or the Declaration mailed Oct. 1, 2010, re PCT/US2010/034823 filed May 14, 2010.
(Continued)

*Primary Examiner* — Wutchung Chu
(74) *Attorney, Agent, or Firm* — Daly, Crowley, Mofford & Durkee, LLP

(57) ABSTRACT

According to one embodiment, a communication system includes an analog voice bridge coupling one secure network domain to another. The analog voice bridge includes two codecs that are each coupled to a secure network domain and to each other through an analog voice line. One codec decapsulates an analog voice signal from a digital voice stream received from a terminal, and transmits the analog voice signal to the other codec through the analog voice line. The other codec encapsulate the analog voice signal in another digital voice stream and transmit the encapsulated digital voice stream to another terminal coupled through the other secure network domain. The analog voice line conveys the analog voice signal from the first codec to the second codec while restricting communication of the digital packet stream between the two secure network domains.

20 Claims, 2 Drawing Sheets

(51) Int. Cl.
G06F 21/50 (2013.01)
G06F 21/60 (2013.01)

(56) References Cited

U.S. PATENT DOCUMENTS

| | | | |
|---|---|---|---|
| 5,577,209 | A | 11/1996 | Boyle et al. |
| 5,974,142 | A | 10/1999 | Heer et al. |
| 6,122,359 | A | 9/2000 | Otto et al. |
| 6,188,978 | B1* | 2/2001 | Harada ............ 704/201 |
| 6,243,376 | B1 | 6/2001 | Ng et al. |
| 6,392,999 | B1 | 5/2002 | Liu et al. |
| 6,411,965 | B2 | 6/2002 | Klug |
| 6,445,931 | B1 | 9/2002 | Lee |
| 6,728,784 | B1 | 4/2004 | Mattaway |
| 6,760,421 | B2 | 7/2004 | Heilmann et al. |
| 6,771,740 | B1 | 8/2004 | Bingel |
| 6,775,273 | B1 | 8/2004 | Kung et al. |
| 6,813,264 | B2 | 11/2004 | Vassilovski |
| 6,826,173 | B1 | 11/2004 | Kung et al. |
| 6,829,234 | B1 | 12/2004 | Kaplan et al. |
| 6,857,072 | B1 | 2/2005 | Schuster et al. |
| 6,909,708 | B1 | 6/2005 | Krishnaswamy et al. |
| 6,930,730 | B2 | 8/2005 | Maxon et al. |
| 6,967,958 | B2 | 11/2005 | Ono et al. |
| 7,099,653 | B2 | 8/2006 | Creamer et al. |
| 7,127,048 | B2 | 10/2006 | Bremer et al. |
| 7,133,514 | B1 | 11/2006 | Cook et al. |
| 7,139,263 | B2 | 11/2006 | Miller et al. |
| 7,149,208 | B2 | 12/2006 | Mattaway et al. |
| 7,209,473 | B1 | 4/2007 | Mohaban et al. |
| 7,221,660 | B1 | 5/2007 | Simonson et al. |
| 7,298,702 | B1 | 11/2007 | Jones et al. |
| 7,343,177 | B2 | 3/2008 | Seshadri et al. |
| 7,415,005 | B1 | 8/2008 | Macha et al. |
| 7,508,310 | B1 | 3/2009 | Light et al. |
| 7,512,967 | B2 | 3/2009 | Sentoff |
| 7,567,555 | B1 | 7/2009 | Ricciardi et al. |
| 7,571,317 | B1 | 8/2009 | Vilhuber |
| 7,626,951 | B2 | 12/2009 | Croy et al. |
| 7,634,533 | B2 | 12/2009 | Rudolph et al. |
| 7,660,575 | B2 | 2/2010 | Yeap et al. |
| 7,693,131 | B2 | 4/2010 | Kaplan et al. |
| 7,701,974 | B2 | 4/2010 | Mayer et al. |
| 7,711,828 | B2 | 5/2010 | Shew et al. |
| 7,782,826 | B2 | 8/2010 | Olivier et al. |
| 7,899,038 | B2 | 3/2011 | Ulybin |
| 8,250,360 | B2* | 8/2012 | Winig ............ 713/154 |
| 2002/0097708 | A1 | 7/2002 | Deng |
| 2002/0129236 | A1 | 9/2002 | Nuutinen |
| 2003/0018918 | A1 | 1/2003 | Natsuno et al. |
| 2003/0051130 | A1 | 3/2003 | MeLampy et al. |
| 2003/0128696 | A1 | 7/2003 | Wengrovitz et al. |
| 2003/0133558 | A1* | 7/2003 | Kung et al. ............ 379/215.01 |
| 2003/0167394 | A1 | 9/2003 | Suzuki et al. |
| 2003/0224807 | A1 | 12/2003 | Sinha et al. |
| 2004/0008423 | A1 | 1/2004 | Driscoll, Jr. et al. |
| 2004/0032843 | A1* | 2/2004 | Schaefer et al. ............ 370/338 |
| 2004/0034723 | A1 | 2/2004 | Giroti |
| 2004/0179555 | A1* | 9/2004 | Smith ............ 370/521 |
| 2004/0203799 | A1 | 10/2004 | Siegel |
| 2005/0257052 | A1 | 11/2005 | Asai et al. |
| 2006/0020800 | A1 | 1/2006 | Holden et al. |
| 2006/0029050 | A1 | 2/2006 | Harris et al. |
| 2006/0230143 | A1 | 10/2006 | Ziegler et al. |
| 2007/0250921 | A1 | 10/2007 | LiVecchi |
| 2007/0255942 | A1* | 11/2007 | Weller et al. ............ 713/151 |
| 2007/0297588 | A1 | 12/2007 | Benco et al. |
| 2008/0008312 | A1 | 1/2008 | Ganesamoorthi et al. |
| 2008/0049753 | A1 | 2/2008 | Heinze et al. |
| 2008/0123670 | A1* | 5/2008 | Mundra et al. ............ 370/401 |
| 2008/0130563 | A1* | 6/2008 | Xu et al. ............ 370/329 |
| 2008/0240416 | A1* | 10/2008 | Abramson et al. ....... 379/428.03 |
| 2009/0271858 | A1 | 10/2009 | Cooke et al. |
| 2010/0245107 | A1 | 9/2010 | Fulker et al. |
| 2010/0260173 | A1 | 10/2010 | Johnson |

FOREIGN PATENT DOCUMENTS

| | | |
|---|---|---|
| WO | WO 01/37585 | 5/2001 |
| WO | WO 2010/135162 | 11/2010 |
| WO | WO 2010/135163 | 11/2010 |

OTHER PUBLICATIONS

Masiyowski et al., U.S. Appl. No. 12/686,814, filed Jan. 13, 2010, entitled "System and Method for Providing Voice Communications over a Multi-Level Secure Network".

Masiyowski et al., U.S. Appl. No. 12/686,946, filed Jan. 13, 2010, entitled "User Interface for Providing Voice Communications over a Multi-Level Secure Network".

PCT Notification of Transmittal of the Intl. Search Report and the Written Opinion of the Intl. Searching Authority, or the Declaration mailed Oct. 1, 2010, re PCT/US2010/034629 filed May 13, 2010.

PCT Notification of Transmittal of the Intl. Search Report and the Written Opinion of the Intl. Searching Authority, or the Declaration mailed Oct. 5, 2010, re PCT/US2010/034824 filed May 14, 2010.

Office Action dated Nov. 20, 2012 for U.S. Appl. No. 12/086,814, filed Jan. 13, 2012, 18 pages.

Response to Office Action dated Nov. 20, 2012 for U.S. Appl. No. 12/086,814, filed Feb. 19, 2013, 9 pages.

Terminal Disclaimer filed Feb. 19, 2013, for U.S. Appl. No. 12/086,814, 1 page.

Letter dated Dec. 4, 2012 enclosing Official Notification of Grant of UK patent application No. GB1119955.1, issued Dec. 26, 2012, 3 pages.

Response to Office Action dated Sep. 17, 2012 for U.S. Appl. No. 12/686,946, filed Jan. 13, 2012, 19 pages.

Examination Report dated Dec. 8, 2011; for GB Pat. App. No. 1119955.1, Nov. 18, 2011; 6 pages.

Response to Examination Report dated Dec. 8, 2011; for GB Pat. App. No. 1119955.1, filed Nov. 18, 2011; 7 pages.

Examination Report under Section 18(3) of Great Britain; dated Jul. 9, 2012; for GB Pat. App. No. 111-9955.1; 2 pages.

PCT/US2010/034823 International Report on Patentability dated Oct. 1, 2010, 8 pages.

PCT/US2010/034824 Int'l Preliminary Report on Patentability dated Nov. 22, 2011, 8 pages.

Office Action dated Jul. 9, 2012 for GB Appl. No. 1119955.1, 2 pages.

Response to Office Action dated Jul. 9, 2012, filed Sep. 10, 2012 for GB Appl. No. 1119955.1, 3 pages.

PCT Notification of Transmittal of the Intl. Search Report and the Written Opinion of the Intl. Searching Authority, or the Declaration mailed Oct. 1, 2010, re PCT/US2010/034823 filed May 14, 2010, 15 pages.

PCT Notification of Transmittal of the Intl. Search Report and the Written Opinion of the Intl. Searching Authority, or the Declaration mailed Oct. 5, 2010, re PCT/US2010/034824 filed May 14, 2010, 14 pages.

U.S. Appl. No. 12/686,946, filed Jan. 13, 2010, file from Aug. 20, 2012 through Sep. 20, 2012, 317 pages.

U.S. Appl. No. 12/686,814, filed Jan. 13, 2010, file through Oct. 19, 2012, 611 pages, Part1.

U.S. Appl. No. 12/686,814, filed Jan. 13, 2010, file through Oct. 19, 2012, 579 pages, Part2.

Notice of Allowance dated May 31, 2013 for U.S. Appl. No. 12/686,814, filed Jan. 13, 2010, 12 pages.

Final Office Action dated Jun. 5, 2013 for U.S. Appl. No. 12/686,946, filed Jan. 13, 2012, 21 pages.

Records letter dated Mar. 12, 2013 enclosing Certificate of Grant of UK patent application No. GB1119955.1, issued Dec. 26, 2012, 3 pages.

Response filed Dec. 11, 2013 to Office Action in U.S. Appl. No. 12/686,946 dated Sep. 13, 2013, 21 pages.

RCE and Response as filed Sep. 4, 2013 in U.S. Appl. No. 12/686,946, 14 pages.

(56) References Cited

OTHER PUBLICATIONS

Office Action in U.S. Appl. No. 12/686,946 dated Sep. 13, 2013, 20 pages.
CISCO Unified Communications Manager: Security Guide, Release 7.0(1), DISCO Systems Inc., 2008, pp. 1-0 to 18-6, 200 pages.
Certification and Request for Consideration of an Information Disclosure Statement Filed After Payment of the Issue Fee under the QPIDS Pilot Program, RCE, Petition to Withdraw From Issue and an IDS filed in U.S. Appl. No. 12/686,814 on Sep. 17, 2013, 9 pages.

* cited by examiner

ANALOG VOICE BRIDGE

RELATED APPLICATIONS

This application claims priority to U.S. Provisional Patent Application Ser. No. 61/216,979, entitled "METHOD AND SYSTEM FOR CREW COMMUNICATIONS USING MULTI-LEVEL REAL-TIME VOICE OVER IP INTERCOM," which was filed on May 22, 2009. U.S. Provisional Patent Application Ser. No. 61/216,979 is hereby incorporated by reference.

GOVERNMENT RIGHTS

This invention was made with government support under government contract number F09604-03-D-0007, Crew Communications. The Government has certain rights in this invention.

TECHNICAL FIELD OF THE DISCLOSURE

This disclosure generally relates to data networks, and more particularly, to an analog voice bridge that provides voice communications while inhibiting data communications between a secure network boundary and a method of operating the same.

BACKGROUND OF THE DISCLOSURE

Traditional voice telephony has been provided by the public switched telephone network (PSTN). The public switched telephone network is a circuit-based architecture in which call sessions may be selectively established among multiple users using point-to-point connection protocols, such as a time division multiplex (TDM) protocol. The advent of Internet protocol (IP) based systems, however, has provided voice communication and other associated communications networks using a mesh-based architecture, such as the Internet. Newer telephony networks have been migrating towards Internet protocol (IP) based systems. Voice over Internet protocol (VoIP) is a particular type of protocol that has been established to promote the use of voice communications over packet-based networks, such as the Internet.

SUMMARY OF THE DISCLOSURE

According to one embodiment, a communication system includes an analog voice bridge coupling one secure network domain to another. The analog voice bridge includes two codecs that are each coupled to a secure network domain and to each other through an analog voice line. One codec decapsulates an analog voice signal from a digital voice stream received from a terminal, and transmits the analog voice signal to the other codec through the analog voice line. The other codec encapsulate the analog voice signal in another digital voice stream and transmit the encapsulated digital voice stream to another terminal coupled through the other secure network domain. The analog voice line conveys the analog voice signal from the first codec to the second codec while restricting communication of the digital packet stream between the two secure network domains.

Some embodiments of the disclosure may provide numerous technical advantages. For example, one embodiment of the analog voice bridge may provide enhanced security than may be provided using known network isolation devices, such as firewalls, that may be circumvented in certain cases. The analog voice bridge provides a solution to this problem by providing an analog voice line that is only adapted to convey analog voice signals and not capable of conveying data packets. Thus, the analog voice bridge according to the teachings of the present disclosure may provide voice communications across secure network boundaries while restricting transmission of data packets using a technique that isolates secure network domains from one another.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

Voice telephony over a packet network, such as the Internet, may be provided by a voice over Internet protocol (VoIP) that provides for encapsulation of voice signals and performing various signaling procedures typically provided by circuit-based telephony architectures such as the public switched telephone network (PSTN). Security for telephony systems implemented on packet-based networks, however, may be relatively difficult to implement. For example, information transmitted through the packet-based networks may be conveyed using packets that may be either inadvertently or intentionally misdirected to an improper location. These problems may be worsened by newer secure telephony systems that implement a multi-level secure (MLS) telephony system in which call sessions may be associated with one of several differing levels of security. The migration to Internet protocol (IP) based telephony systems presents a new challenge for MLS voice communications because the network topology on which it is based is inherently asynchronous. Essentially, all of the mechanisms used to prevent improper classification mixing in the circuit domain cannot be applied to a packet-based infrastructure.

Certain organizations have implemented communication networks configured with a multi-level secure (MLS) environment that may include one or more releasiblity levels for each security level. For example, the government may have a multi-level security including secret, top secret (TS), and top secret/sensitive compartmented information (TS/SCI). Intelligence systems and systems that process sensitive compartmented information (SCI) are governed according to the Director of Central Intelligence Directive (DCID) 6/3 specification. The Director of Central Intelligence Directive specifies that information transmissions of different security levels shall be segregated from each other (e.g., encryption, physical separation). To meet the specification provided by the government, therefore, communication networks should separate data stream according to its security level and provide physical separation from data streams from other networks having a differing level of security. This separation, however, may be problematic for voice communications using a packetized protocol such as the voice over Internet protocol that may transmit voice signals across security boundaries using voice data packets.

Figure 1:
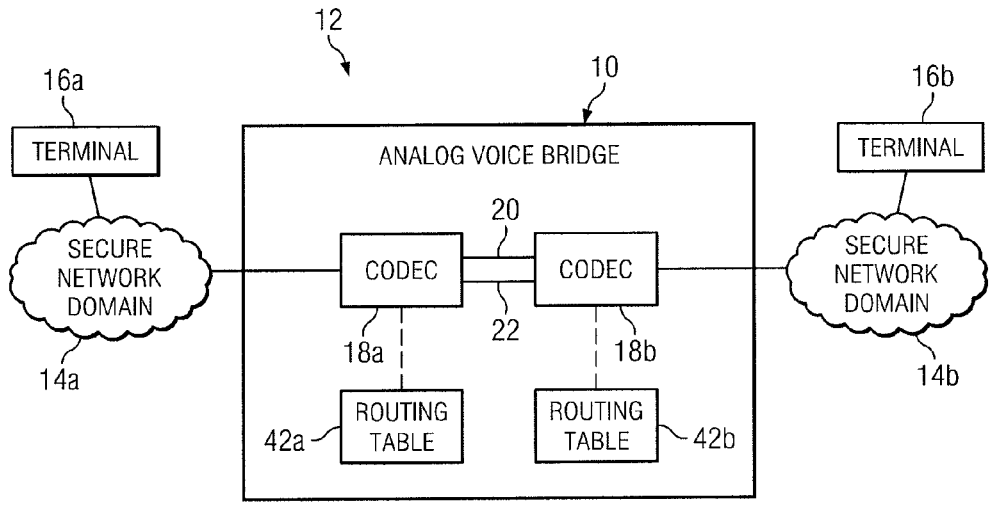
FIG. 1 is a diagram of one embodiment of an analog voice bridge according to the teachings of the present disclosure that may be configured in a communication network.

FIG. 1 is a diagram of one embodiment of an analog voice bridge 10 according to the teachings of the present disclosure that may be configured in a communication network 12. Communication network 12 includes two secure network domains 14a and 14b that are each configured with a terminal 16a and 16b and coupled together through analog voice bridge 10 as shown. Terminals 16a and 16b convert audio signals generated or received by a user to digital voice signals suitable for transmission through secure network domains 14a and 14b. Analog voice bridge 10 includes two codecs 18a and 18b that couple secure network domains 14a and 14b together through one or more analog voice lines 20 and one or more signaling lines 22. Analog voice bridge 10 also includes two routing tables 42a and 42b that are each associated with each codec 18a and 18b, respectively. Codecs 18a and 18b provide voice communication between terminals 16a and 16b by conveying analog voice signals between secure network domains 14a and 14b while restricting transmission of data packets between secure network domains 14a and 14b.

Certain embodiments of communication network 12 may provide an enhanced technique for communicating voice signals across packet network domains while maintaining physical separation necessary for restricting transmission of data packets across secure network domains 14a and 14b with differing levels of security. Mechanisms such as firewall routers may be used to restrict illicit or inadvertent transmission of unwanted data packets across security level domains, yet these devices possess a drawback in that the logic used to discriminate illicit packets from authorized packets is often inherently prone to spoofing, hacking, or errors that may compromise the security of each secure network domain 14a or 14b. Certain embodiments of analog voice bridge 10 configured with codecs 18a and 18b that transfer voice signals using analog voice line 20 provides a solution to this problem by not providing a path for the inadvertent transmission of data packets across the security boundary provided by analog voice line 20.

Each codec 18a or 18b converts voice data packets from its respective secure network domain 14a or 14b to or from an analog voice stream suitable for transmission across analog voice line 20. An example codec 18a and 18b may include an analog to digital converter (ADC) for converting the analog voice stream to digital signal stream, a digital to analog converter (DAC) for converting the digital signal stream to the analog stream, and associated logic for encapsulating or decapsulating the analog voice stream to or from the digital signal stream in packets suitable for transmission over secure network domains 14a and 14b. Codecs 18a and 18b may also be coupled to one another through one or more signaling lines 22 that provide call setup, call teardown, or other call negotiation procedures, such as Push-To-Talk (PTT) signal propagation.

In one embodiment, analog voice line 26 comprises a pair of electrical conducting wires that convey analog voice signals whose voltage is proportional to its amplitude. In other embodiments, analog voice line 26 may include other types of signaling techniques that convey analog voice signals from codec 24a to and from codec 24b. For example, multiple analog voice signals may be multiplexed with one another on analog voice line using a time division multiplex access (TDMA) multiplexing technique. As another example, analog voice line 26 may convey a digital signal stream, such as a T1 signal forming a digital representation of the analog voice signal.

Secure network domains 14a and 14b may include any type of packet data network. For example, secure network domains 14a and 14b may be a packet data network, such as a public or private network, a local area network (LAN), a metropolitan area network, a wide area network (WAN), a wireline or wireless network, a global communication network, an optical network, a satellite network, an enterprise intranet, an intranet, a virtual private network (VPN), the Internet, or any combination of the preceding. In one embodiment, secure network domains 14a and 14b may form a portion of the global information grid (GIG), a network established by the United States Department of Defense (DoD) to promote information sharing among its member organizations. The global information grid defines a set of information handling capabilities, associated processes, and personnel for managing information among its various military agencies.

The global information grid include a multi-level security (MLS) architecture in which secure network domains 14a and 14b may be established according to varying security levels, such as unclassified, classified, secret, and top secret security levels, and may include one or more releasibility levels, such as a sensitive compartmented information (SCI) releasibility level. For example, secure network domains 14a and 14b may be government managed networks in which one secure network domain 14a is classified as a top secret secure network and the other secure network domain 14b is classified as a secret secure network. To qualify for protection level4 (PL4) requirements of the DCID 6/3 specification, each secure network domain 14a and 14b should be physically separate such that essentially no physical path exists for the transmission of voice data packets from one secure network domain 14a to secure network domain 14b. In many cases, however, it may be desirous for personnel with terminals 16a configured on secure network domain 14a to verbally communicate in real-time with one or more other personnel with terminals 16b configured on the other secure network domain 14b. Thus, analog voice line 20 provides a mechanism for conveying analog voice signals while restricting illicit and/or inadvertent transmission of data packets from one secure network domain 14a to secure network domain 14b.

Terminals 16a and 16b convert audio signals generated or received by a user to or from voice data packets suitable for transmission through its respective secure network domain 14a and 14b. In many respects, terminals 16a and 16b function in a manner similar to a handset coupled to the public switched telephone network (PSTN). In one embodiment, terminals 16a and 16b communicate signaling information with analog voice bridge using the transfer control protocol/Internet protocol (TCP/IP) and transfer digital voice signals using a real-time protocol (RTP) and a session initiation protocol (SIP). In another embodiment, terminals 16a and 16b include a computing system that executes a web browser in which voice communication through analog voice bridge 10 is restricted to those terminals 16a and 16b that access analog voice bridge 10 using their statically assigned IP source addresses as an authorization mechanism. Thus in some embodiments, the security of analog voice bridge 10 may be enhanced by restricting access to only those terminals 16a and 16b for which secure communication may be provided using commonly used components with well established security mechanisms, such as IP address filtering, and a hypertext transfer language secure (HTTPS) protocol.

In one embodiment, voice communication from terminals 16a and 16b to codecs 18a and 18b, respectively, are transmitted in voice data packets conforming to the voice over Internet protocol (VoIP). The voice over Internet protocol provides for streaming of voice signals and includes mechanisms for implementing secure connections over secure network domains 14a and 14b. Additionally, the voice over Internet protocol specifies signaling techniques that may be used by terminals 16a and 16b to establish various types of voice connections. In one embodiment, terminals 16a and 16b may establish intercom connections (conference connections) among one another in which voice transmission is conducted using a push-to-talk (PTT) button configured on each terminal 16a and 16b.

Figure 2:
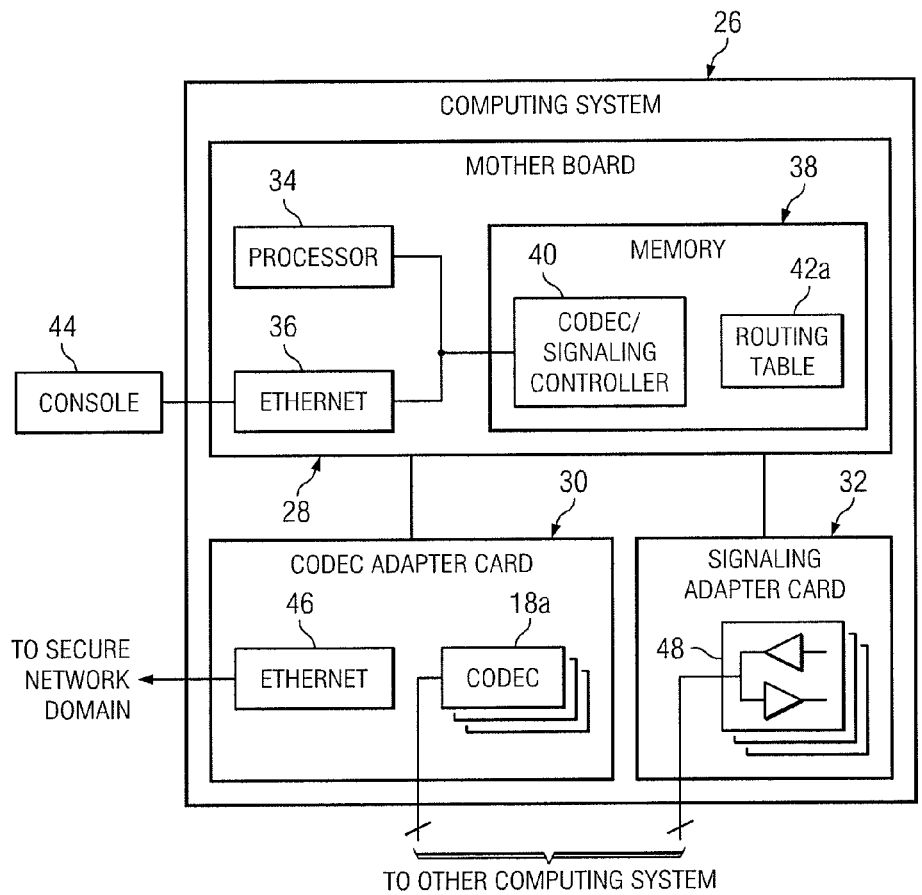
FIG. 2 is a diagram showing one embodiment of a computing system that includes one or more codecs of FIG. 1.

FIG. 2 is a diagram showing one embodiment of a computing system 26 that includes one or more codecs 18a of FIG. 1. Computing system 26 includes a motherboard coupled to a codec adapter card 30 and a signaling adapter card 32 through a suitable type of computer bus, such as a peripheral component interconnect (PCI) or an industry standard architecture (ISA) computer bus. Motherboard 28 has a processor 34 coupled to an Ethernet port 36 and a memory 38 that stores a codec/signaling controller 40 and a routing table 42a. Ethernet port 36 is coupled to a console 44 for configuration of computing system 26. Although only one computing system 26 is shown, it should be understood that one or more codecs 18b of FIG. 1 may be implemented in similar computing system 26.

Processor 34 executes codec/signaling controller 40 stored in memory 38 to control codec adapter card 30 and signaling adapter card 32 for implementing the various features of analog voice bridge 10. In one embodiment, computing system 26 is a commercial-off-the-shelf computing system capable of operating with a standard operating system, such as a Unix, Linux, Windows, or Macintosh operating system. In a particular embodiment, computing system 26 is a commercially available computing system configured with multiple codecs 18a and marketed under the tradename "Mercury interface Unit", which is available from Trilogy Communications Limited, and located in Andover, Hampshire, United Kingdom.

Routing table 42a stores routing information about terminals 16a and 16b that communicate through analog voice bridge 10. Additionally, routing table 42b stores call connection and state information about terminals 16a and 16b that communicate through analog voice bridge 10. Computing systems 26 embodying each codec 18a or 18b may have their own routing table 42a and 42b such that registration of a communication link between terminals 16a and 16b, and other terminals configured in the same secure network domains 14a and 14b may be conducted independently of one another. In particular embodiments, routing tables 42a and 42b are configured according to a positive inclusion policy. That is, the only voice connections allowed through analog voice bridge 10 are those that have been previously registered on the routing tables 42a 42b of both computing systems 26 embodying codecs 18a and 18b.

Codec adapter card 30 may include one or more codecs 18a. In the particular embodiment shown, codec adapter card 30 has multiple codecs 18a for providing multiple voice connections between secure network domains 14a and 14b simultaneously. Codec adapter card 30 also includes a dedicated Ethernet port 46 that receives and transmits digital voice packets from its respective secure network domain 14a. Providing an Ethernet port 46 separate from Ethernet port 36 may provide certain advantages including separation of voice traffic from configuration data packets used to configure the operation of codec/signaling controller 40. Providing Ethernet port separately from Ethernet port 36 may also provide another advantage in that its coupling to codecs 18a and 18b may be provided without connection through the computing system's computer bus connectors that may otherwise reduce throughput and/or signal quality of voice signals transferred between codecs 18a and 18b and Ethernet port 46.

In one embodiment, routing table 42a is only locally configurable using console 44. That is, modification of routing table 42a may be restricted from other access points of computing system 26, such as Ethernet port 46 that would otherwise allow its modification through another node remotely configured on its associated secure network domain 14a. In this manner, illicit access across secure network domains 14a and 14b enabled by modification of routing table 42a may be effectively mitigated or eliminated. Without this feature, for example, a particular node coupled to computing system 26 through its respective secure network domain 14a may be able to gain illicit access to the other secure network domain 14a by remotely configuring routing table 42a to allow unauthorized access to the other secure network domain 14b through analog voice bridge 10.

Signaling adapter card 32 includes one or more I/O ports 48 for transferring logic signals with signaling adapter card of its complementary computing system. Logic signals may include any suitable quantity and/or sequence of signals associated with voice connections across analog voice bridge 10, such as calling sequences associated with a conference call session, or push-to-talk signaling used within conference call sessions. For example, codec/signaling controller 40 may receive a call request from terminal 16a configured on secure network domain 14a requesting a conference call session with terminal 16b configured on secure network domain 14b. In response to the call request, codec/signaling controller 40 controls I/O ports 48 to generate logic signals that are transmitted to I/O ports of its complementary computing system for setting up a conference call with terminal 16. Codec/signaling controller 40 of the complementary computing system 26 processes the received logic signals to initiate the conference call session with terminal 16b. In one embodiment, generation of logic signals through I/O ports 48 is restricted to control only by codec/signaling controller 40. That is, the operation of I/O ports 48 may not be manipulated through instructions or messages received through Ethernet port 36, Ethernet port 46, or other communication interface provided on computing system 26. In this manner, the security boundary provided between secure network domains 14a and 14b may not be breeched by performing illicit call signaling techniques from one computing system 26 to the other.

Computing system 26 may generally be adapted to execute any of the known OS2, UNIX, Mac-OS, Linux, and Windows Operating Systems or other operating systems. Computing system 26 in this embodiment comprises a processor 34, a memory 38, a console 44, and other devices such as a mouse, a keyboard, a printer, and other communication links. In other embodiments, computing system 26 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 34, may manage the operation of the computing system 26. Examples of the processor 34 include one or more microprocessors, one or more applications, and/or other logic. Certain logic may include a computer program, software, computer executable instructions, and/or instructions capable being executed by the computing system 26. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 38. The memory 38 may comprise one or more tangible, computer-readable, and/or computer-executable storage medium. Examples of the memory 38 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although the illustrated embodiment provides one embodiment of a computer that may be used with other embodiments, such other embodiments may additionally utilize computers other than general purpose computers as well as general purpose computers without conventional operating systems. Additionally, embodiments may also employ multiple general purpose computers 26 or other computers networked together in a computer network. For example, multiple general purpose computers 26 or other computers may be networked through the Internet and/or in a client server network. Embodiments may also be used with a combination of separate computer networks each linked together by a private or a public network.

Figure 3:
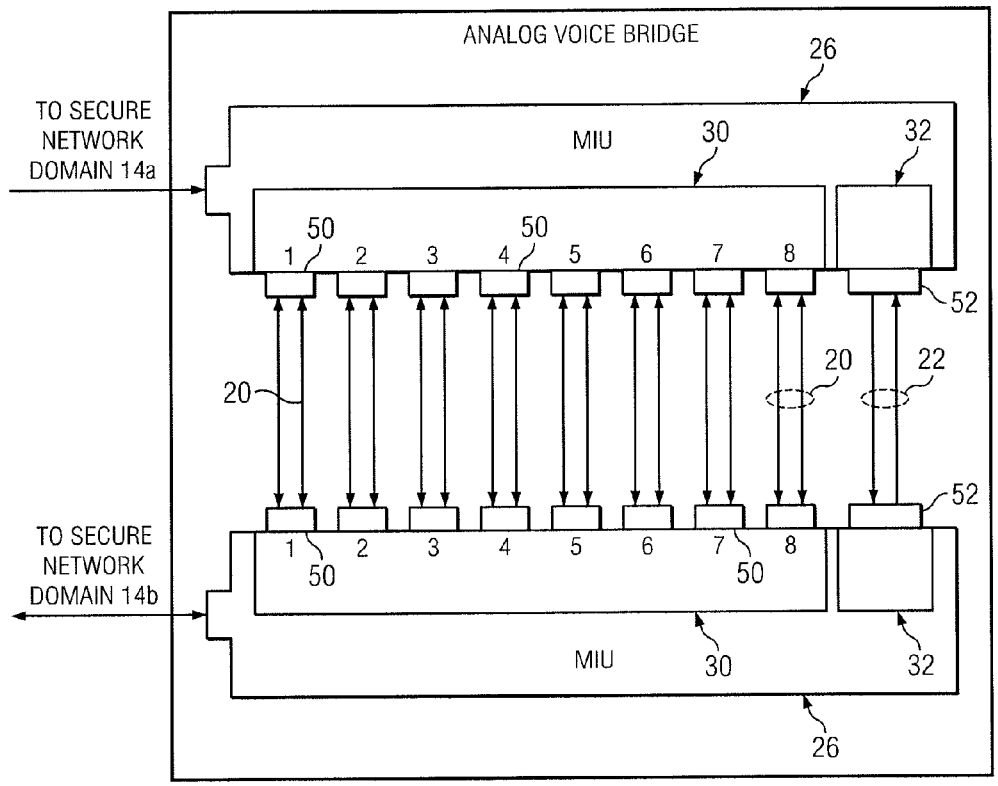
FIG. 3 is a schematic diagram showing one embodiment of multiple analog voice lines and signaling lines that may be configured to route analog voice signals and signaling, respectively between computing systems of FIG. 2.

FIG. 3 is a schematic diagram showing one embodiment of multiple analog voice lines 20 and signaling lines 22 that may be configured to route analog voice signals and signaling, respectively between computing systems 26. Codec adapter card 30 and signaling adapter card 32 each include one or more connectors 50 and 52, respectively, for physical interconnection with analog voice lines 20 and signaling lines 22. In one embodiment, computing systems 26 embodying codecs 18a and 18b are configured in relatively close proximity to each other such that interconnection of analog voice lines 20 between computing systems 26 may be closely controlled. In one embodiment, analog voice lines 20 may be void of any active circuitry, such as busses, routers, or amplifiers that may increase their complexity and thus increase the possibility of an incorrect connection between computing systems 26. In another embodiment, analog voice lines 20 and signaling lines 22 are color coded to match a color coding scheme of their associated connectors 50 and 52. For the example shown in which codec adapter card includes eight connectors 50, each connector 50 of codec adapter card 30 may be labeled with one of a black, brown, red, orange, yellow, green, blue, or violet colored label.

Correspondingly, each of eight analog voice lines 20 may be labeled with similar individual colored labels. Using this color coding scheme, the possibility of inadvertent mismatch of analog voice lines 20 between computing system 26 may be reduced or eliminated.

Modifications, additions, or omissions may be made to analog voice bridge 10 without departing from the scope of the disclosure. The components of analog voice bridge 10 may be integrated or separated. For example, the components of codec adapter card 30 and/or signaling adapter card 32 may be implemented on a separate circuit card as shown or may be implemented with the other Moreover, the operations of analog voice bridge 10 may be performed by more, fewer, or other components. For example, computing systems 26 may each be configured with a hardware of software firewall to further restrict access to analog voice lines 20 and/or signaling lines 22 between the two secure network domains 14a and 14b. Additionally, operations of codec/signaling controller 40 may be performed using any suitable logic comprising software, hardware, and/or other logic.

Figure 4:
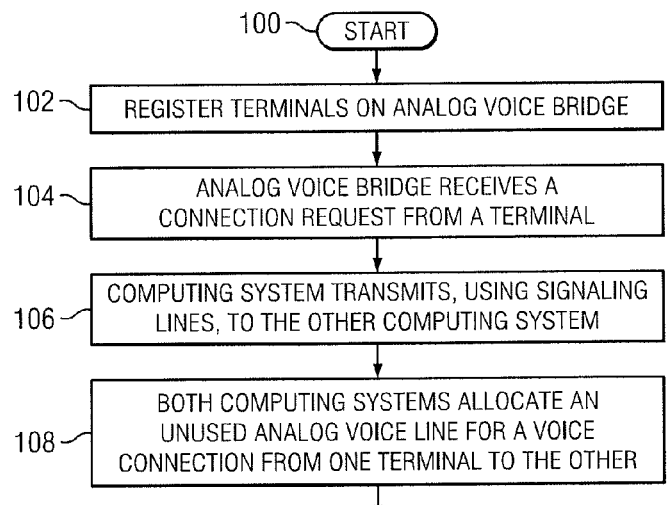
FIG. 4 is a flowchart showing one embodiment of a series of actions that may be performed by the analog voice bridge of FIG. 1 to provide communication between terminals configured on secure network domains and with differing security levels.

FIG. 4 is a flowchart showing one embodiment of a series of actions that may be performed by analog voice bridge 10 to provide communication between terminals 16a and 16b configured on secure network domains 14a and 14b with differing security levels. In act 100, the process is initiated.

In act 102, terminals 16a and 16b are registered for use on analog voice bridge 10. Terminals 16a and 16b may be registered for use by modifying routing tables 42a and 42b associated with both computing systems 26 configured in analog voice bridge 10. Registration of terminals 16a and 16b may include an authentication, authorization scheme for themselves as well as an authentication, authorization scheme for the user of terminals 16a and 16b. In one embodiment, authorization of the user of terminals 16a and 16b may include validation of the user to use that particular terminal 16a or 16b. For example, a particular user having a security clearance level of secret may attempt to access a particular terminal 16a configured on a top secret secure network domain 14a Thus, analog voice bridge 10 may reject the communication attempt due to lack of proper authorization of the user with that particular terminal 16a.

Registration of terminals 16a and 16b using routing tables 42a and 42b provides a positive inclusion policy in which only voice sessions that have been previously registered may be allowed to communicate through analog voice bridge 10. Routing table 42a may include information associated with terminals 16a configured on its secure network domain 14a and terminals 16b coupled to the other secure network domain 14b. In one embodiment, registration of terminals 16a and 16b on routing table 42a is only modifiable through a locally configured console 44. That is, modification of routing tables 42a and 42b through a remote node that is remotely configured on secure network domain 14a may be restricted.

In one embodiment, routing tables 42a and 42b associated with each secure network domain 14a and 14b are manually modified by an information system security officer (ISSO) responsible for his or her secure network domain 14a or 14b. In this manner, registration of communication sessions through analog voice bridge 10 may be registered while maintaining physical separation of secure network domains 14a and 14b from one another. For example, it may be desired to provide a voice communication path from terminal 16a configured on secure network domain 14a with another terminal 16b configured on the other secure network domain 14b. Following registration of terminals 16a and 16b with their associated secure network domains 14a and 14b as described with reference to act 102, the information system security officers responsible for secure network domain 14a may modify routing table 42a associated with the secure network domain 14a and communicate the desired voice communication path to the other information system security officer responsible for the other secure network domain 14b. The other information system security officer may then modify the routing table 42b associated with secure network domain 14b in analog voice bridge 10.

In act 104, analog voice bridge 10 receives a connection request from terminal 16a configured on secure network domain 14a and validates the connection request according to routing table 42a. In one embodiment, the connection request is transmitted from terminal 16a using a TCP/IP protocol using a browser-based user interface. In another embodiment, analog voice bridge 10 restricts all connection requests that have not originated from a browser-based interface and assigned to that terminal.

In act 106, computing system 26 transmits, using signaling lines 22, the connection request to the other computing system 26 of analog voice bridge 10 for its validation. The other computing system 26 may verify that terminal 16a configured on its secure network domain 14a has been registered to communicate with the other terminal 16b. In one embodiment, computing systems 26 may use a proprietary signaling sequence through signaling lines 22. In this manner, spoofing of connection requests through analog voice bridge 10 may be reduced or eliminated. In another embodiment, signaling lines 22 are restricted to convey only information necessary for establishing, maintaining, or tearing down voice connections through analog voice bridge 10. Thus, signaling lines 22 may be restricted from transferring any information, such as data packets, from one computing system 26 to the other.

In act 108, computing systems 26 allocate an unused analog voice line 20 in response to a validated connection request and complete the voice connection between terminals 16a and 16b. Once allocated, voice data packet streams originating from terminals 16a and 16b may be coupled to codecs 18a and 18b associated with the analog voice line 20 and vice-versa.

When voice communication between terminals 16a and 16b are no longer needed or desired, the voice connection is removed from analog voice line 20 in which the process ends in act 110.

Any suitable type of connection may be established through analog voice bridge 10. In one embodiment, terminal 16a may attempt to initiate an intercom connection in which ensuing voice messages with terminal 16b may be provided by a push-to-talk (PTT) voice message transmission scheme. Using the PTT voice message transmission scheme, voice messages originating at one terminal 16a or 16b may be transmitted in half-duplex or full-duplex fashion to the other terminal 16b or 16a at the push of a button configured on the transmitting terminal 16a and 16b. In another embodiment, voice transmissions across analog voice bridge 10 using a "hot mic" voice message transmission scheme may be restricted. The term "hot mic" voice message transmission scheme generally refers to transmission of voice messages over an intercom connection without manually operating a physical actuation device, such as a terminal mounted button. By restricting the use of "hot mic" voice message transmission schemes, therefore, the possibility of inadvertent voice transmission across security boundaries may be reduced or eliminated.

Modifications, additions, or omissions may be made to the method without departing from the scope of the disclosure. The method may include more, fewer, or other acts. For example, the computing system 26 associated with the receiving terminal 16 may first transmit the request to the receiving terminal 16 for acceptance of the connection request by its user. Thus, only upon acceptance of the connection request by the receiving terminal 16 is the unused analog voice line 20 allocated to complete the voice connection through analog voice bridge 10.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A communication system comprising:
    a first codec coupled to a first terminal through a first packet network and operable to decapsulate an analog voice signal from a first packet stream received from the first terminal, wherein the first packet stream comprises, within the same packet stream, digitized information representing both an analog voice signal portion and a non-voice signal portion, the analog voice signal portion comprising an analog voice signal and the non-voice signal portion comprising a data signal, the data signal comprising non-voice data and including no analog voice signals, and wherein the first codec is configured to transmit only the analog voice signal portion of the first packet stream to an analog voice line and is configured to prevent the data signal from being transmitted to the analog voice line;
    a second codec coupled to a second terminal through a second packet network, the second packet network being separate from the first packet network, wherein the second codec is operably coupled to the first codec through the analog voice line and one or more signaling lines, wherein the first packet network and the second packet network are configured in a multi-level security (MLS) architecture, the first packet network having a security level that is different than the security level of the second packet network, wherein the second codec is operable to encapsulate the received analog voice signal in a second packet stream and transmit the second packet stream to the second terminal; and
    wherein the analog voice line is operably coupled to the first and second codecs and the first and second packet networks and wherein the analog voice line is constructed and arranged to carry only the analog voice signal and not the data signal, whereby the analog voice line is operable to convey only the analog voice signal portion of the first packet stream from the first codec to the second codec while restricting communication of the data signal in the non-voice signal portion of the first packet stream from being transmitted using the analog voice line, wherein the analog voice line blocks communication of the non-voice data signal of the first packet stream to the second packet network, and blocks communication of the second packet stream with the first packet network, to ensure that the data signal from the first terminal is not transmitted to the second terminal; and
    wherein the one or more signaling lines are operable to convey control signals associated with the analog voice signal, the signaling lines being decoupled from at least one of the first packet network and the second packet network.

2. A communication system comprising:
    a first codec coupled to a first terminal through a first packet network and operable to decapsulate an analog voice signal from a first packet stream received from the first terminal, wherein the first packet stream comprises, within the same packet stream, information that comprises a voice portion and a non-voice portion, the voice portion comprising an analog voice signal and the non-voice portion comprising a data signal that comprises non-voice data and includes no analog voice signals, wherein the first codec is configured to prevent the data signal of the first packet stream from being transmitted to an analog voice line configured between the first packet network and a second packet network, the second packet network separate from the first packet network, wherein the first codec is further configured to permit transmission of only the analog voice signal of the first packet stream, and not the data signal, using the analog voice line, and wherein the first codec is configured to prevent the data signal from being transmitted to the second packet network via the analog voice line; and a second codec coupled to a second terminal through the second packet network and operably coupled to the first codec through the analog voice line, the second codec operable to encapsulate the received analog voice signal in a second packet stream and transmit the second packet stream to the second terminal;

wherein the analog voice line is operably coupled to the first and second codecs and the first and second packet networks, and wherein the analog voice line is configured to convey only the analog voice signal from the first codec to the second codec while restricting communication of the data signal of the first packet stream from being transmitted using the analog voice line, so as to block communication of the data signal of the first packet stream to the second packet network and to ensure that the data signal from the first terminal is not transmitted to the second terminal.

3. The communication system of claim 2, wherein the first codec is configured in a first computing system and the second codec is configured in a second computing system, the first computing system being separate from the second computing system.

4. The communication system of claim 2, wherein the first packet network and the second packet network are configured in a multi-level security (MLS) architecture, the first packet network having a security level that is different than the security level of the second packet network.

5. The communication system of claim 2, further comprising one or more signaling lines coupled between the first computing system and the second computing system, the one or more signaling lines operable to convey control signals associated with the analog voice signal, the signaling lines being decoupled from the first packet network or the second packet network.

6. The communication system of claim 2, further comprising a first routing table associated with the first codec and a second routing table associated with the second codec, the first routing table operable to store registration information associated with the first terminal and the second terminal, respectively, wherein the first codec and the second codec are operable to encapsulate and decapsulate, respectively, the analog voice signal only if the first terminal and the second terminal are registered in the first routing table and the second routing table.

7. The communication system of claim 6, wherein at least one of the first routing table and the second routing table is not configurable from the first packet network or the second packet network.

8. The communication system of claim 6, wherein the first codec is operable to decapsulate the analog voice signal only if the first terminal is registered in the first routing table.

9. The communication system of claim 2, further comprising a plurality of first codecs coupled to a plurality of second codecs through a plurality of analog signal lines, each of the plurality of analog signal lines having a physical port that is associated with a differing colored label relative to the other plurality of analog signal lines.

10. The communication system of claim 2, wherein the analog voice signal comprises an intercom link.

11. The communication system of claim 2, wherein at least one of the first terminal and the second terminal comprises a push-to-talk button, the transmission of the analog voice signal from its respective terminal allowed only during actuation of the push-to-talk button.

12. A communication method comprising:

decapsulating, using a first codec, an analog voice signal from a first packet stream transmitted over a first packet network by a first terminal, wherein the first packet stream comprises, within the same first packet stream, information corresponding to an analog voice signal portion and a non-voice signal portion, the non-voice signal portion comprising a data signal that comprises non-voice data and includes no analog voice signals, and wherein the first codec is configured to prevent the data signal of first packet stream from being transmitted over the analog voice line configured between the first packet network and a second packet network, the second packet network separate from the first packet network, wherein the first codec is further configured to permit transmission, via the analog voice line, of only the analog voice signal portion of the first packet stream, and not the data signal portion, to a second codec in operable communication with the second packet network;

transmitting only the analog voice signal over the analog voice line to the second codec, wherein the analog voice line is operable to convey only analog voice signal information between the first and second codecs and is configured to block communication of the data signal information, such that the data signal is prevented from being transmitted from the first terminal to the second terminal via the analog voice line; and encapsulating, by the second codec, the transmitted analog voice signal in a second packet stream, and transmitting the second packet stream to the second terminal through the second packet network.

13. The communication method of claim 12, wherein the first codec is configured in a first computing system and the second codec is configured in a second computing system, the first computing system being separate from the second computing system.

14. The communication method of claim 12, wherein the first packet network and the second packet network are configured in a multi-level security (MLS) environment, the first packet network having a security level that is different than the security level of the second packet network.

15. The communication method of claim 12, further comprising conveying control signals associated with the analog voice signal between the first codec and the second codec using one or more signaling lines, the one or more signaling lines being decoupled from at least one of the first packet network and the second packet network.

16. The communication method of claim 12, wherein the first codec and the second codec decapsulate and encapsulate, respectively, the analog voice signal only if the first terminal and the second terminal are registered in a first routing table associated with the first packet network and the second routing table associated with the second packet network.

17. The communication method of claim 16, further comprising modifying at least one of the first routing table and the second routing table only from a locally configured console.

18. The communication method of claim 12, further comprising a plurality of first codecs coupled to a plurality of second codecs through a plurality of analog signal lines, each of the plurality of analog signal lines having a physical port that is associated with a differing colored label relative to the other plurality of analog signal lines.

19. The communication method of claim 12, wherein the analog voice signal comprises an intercom link.

20. The communication method of claim 12, wherein at least one of the first terminal and the second terminal comprises a push-to-talk button, the transmission of the analog voice signal from its respective terminal allowed only during actuation of the push-to-talk button.

* * * * *